United States Patent
Mayhew

(10) Patent No.: US 10,832,159 B2
(45) Date of Patent: Nov. 10, 2020

(54) FAST EFFICIENT EVALUATION OF MESSAGES ON AUTOMOTIVE NETWORKS USING LOOK-UP TABLES

(71) Applicant: Battelle Memorial Institute, Columbus, OH (US)

(72) Inventor: Kevin Mayhew, Abingdon, MD (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 729 days.

(21) Appl. No.: 14/857,073

(22) Filed: Sep. 17, 2015

(65) Prior Publication Data
US 2016/0189056 A1 Jun. 30, 2016

Related U.S. Application Data

(60) Provisional application No. 62/097,895, filed on Dec. 30, 2014.

(51) Int. Cl.
*G06N 7/00* (2006.01)
*G06N 20/00* (2019.01)

(52) U.S. Cl.
CPC ............. *G06N 20/00* (2019.01); *G06N 7/00* (2013.01)

(58) Field of Classification Search
None
See application file for complete search history.

(56) References Cited

U.S. PATENT DOCUMENTS

| 8,280,828 B2 | 10/2012 | Perronnin et al. |
| 2014/0297707 A1 | 10/2014 | Oso |

OTHER PUBLICATIONS

Pukish III, et al., Advancements and Implementation of Polynomial-Based Learning Machines for Data Processing and System Modeling, Doctoral Thesis, Auburn University, May 4, 2014, pp. 1-155.*

(Continued)

*Primary Examiner* — Wilbert L Starks
(74) *Attorney, Agent, or Firm* — Fay Sharpe LLP

(57) ABSTRACT

A Support Vector Machine (SVM) classifier employs a kernel $f(x_i,y) \propto \Pi_{d=1}^{D} F(x_{i,d}, y_d)$ or $f(x_i,y) \propto \sigma_{d=1}^{D} F(x_{i,d}, y_d)$ where D is the dimensionality of Support Vectors $x_i$ and vector y is a vector being classified, e.g. representing a message communicated on a Controller Area Network (CAN) bus of a vehicle. The SVM classifier comprises a microprocessor or microcontroller programmed to perform classification using the SVM classifier with at least some terms $F(x_{i,d}, y_d)$ of the kernel $f(x_i,y)$ determined using a look-up table. For those terms $F(x_{i,d}, y_d)$ of the kernel $f(x_i,y)$ determined using a look-up table, the dimension $y_d$ can only assume values defined by a finite set of values. In an embedded system, the microprocessor or microcontroller performs an embedded system function such as engine control, brake control, entertainment system operation, or so forth, or an embedded system function for a vehicle, ocean buoy, or satellite.

17 Claims, 2 Drawing Sheets

(56) References Cited

OTHER PUBLICATIONS

General Motors Corporation, et al., Automotive Collision Avoidance System Field Operational Test, ACAS/FOT Third Annual Report, U.S. Department of Transportation, National Highway Traffic Safety Administration, 2003, pp. 1-113 (Year: 2003).*
Pukish III, et al., Advancements and Implementation of Polynomial-Based Learning Machines for Data Processing and System Modeling, Doctoral Thesis, Auburn University, May 4, 2014, pp. 1-155 (Year: 2014).*
Maji, et al., Efficient Classification for Additive Kernel SVMs, IEEE Transactions on Pattern Analysis and Machine Intelligence, vol. 35, No. 1, 2013, pp. 66-77. (Year: 2013).*
Theissler; Detecting anomalies in multivariate time series from automotive systems; Brunel University London, United Kingdom; School of Engineering & Design; Dec. 9, 2013.
Theissler; An Anomaly Detection Approach to Detect Unexpected Faults in Recordings from Test Drives; World Academy of Science, Engineering and Technology; International Journal of Computer, Electrical, Automation, Control and Information Engineering; vol. 7; No. 7; 2013.
International Search Report and Written Opinion for International Application No. PCT/US15/50615 dated Dec. 23, 2015.

* cited by examiner

… (1) …

FAST EFFICIENT EVALUATION OF MESSAGES ON AUTOMOTIVE NETWORKS USING LOOK-UP TABLES

This application claims the benefit of U.S. Provisional Application No. 62/097,895 filed Dec. 30, 2014 and titled "FAST EFFICIENT EVALUATION OF MESSAGES ON AUTOMOTIVE NETWORKS USING LOOK-UP TABLES". U.S. Provisional Application No. 62/097,895 filed Dec. 30, 2014 is incorporated herein by reference in its entirety.

BACKGROUND

The following relates to the machine classification arts, embedded system arts, automotive network analysis arts, and related arts.

Vehicles (automobiles, trucks, watercraft, aircraft, et cetera) are increasingly utilizing embedded electronic systems. In the automotive context, embedded system units are usually referred to as Electronic Control Units (ECUs), and are commonly networked on a Controller Area Network bus (CAN bus). In a typical communication protocol, a message includes a header, typically including a message identifier followed by a set of data bytes (e.g. 8 bytes=64 bits). In standard automotive CAN bus architectures, the message ID is 11 bits (2048 possible message IDs) or 29 bits (~500 million possible message IDs). Some CAN bus architectures can support both 11-bit and 29-bit message IDs. Collisions are arbitrated by prioritizing the message ID with the most leading zeros; the lower priority message is then re-sent after a specified delay.

There is an expectation in the automotive industry (supported by governmental regulations in some instances) that the CAN bus architecture should be "open" in the sense that third-party manufacturers should be able to provide ECU-equipped components that can connect with an existing CAN bus. This creates a potential entry point for exploitation and challenges in providing CAN bus security against inadvertent glitches and intentional intrusion (e.g. hacking of an ECU or of the entire CAN bus network). Likewise, there are several new entry points for exploitation and pose challenges. A few examples of vulnerable entry points are the tire pressure monitoring system (TPMS), RADAR, LIDAR, camera, on-board diagnostics (e.g. OBD-II), USB, Bluetooth, WiFi enabled on-vehicle hotspots, and cellular connections. The consequences of an unintentional glitch or intentional hack can range from very minor (e.g. the car stereo volume decreasing) to very serious (e.g. loss of vehicle braking, uncontrolled engine acceleration, or aircraft flight control interference).

BRIEF SUMMARY

In one disclosed aspect, a Support Vector Machine (SVM) classifier is disclosed which employs a kernel $f(x_i,y) \propto \Pi_{d=1}^{D} F(x_{i,d}, y_d)$ or a kernel $f(x_i,y) \propto \Sigma_{d=1}^{D} F(x_{i,d}, y_d)$ where D is the dimensionality of Support Vectors $x_i$ and vector y is a vector being classified, for example y may represent a message communicated on a Controller Area Network (CAN) bus of a vehicle. The SVM classifier comprises a microprocessor or microcontroller programmed to perform classification using the SVM classifier with at least some terms $F(x_{i,d}, y_d)$ of the kernel $f(x_i,y)$ determined using a look-up table. The kernel $f(x_i,y)$ may, for example, be a Radial Basis Function (RBF) kernel. In some embodiments, for those terms $F(x_{i,d}, y_d)$ of the kernel $f(x_i,y)$ determined using a look-up table the dimension $y_d$ can only assume values defined by a finite set of values, or in more limited embodiments by a finite set of integers. In some embodiments the microprocessor or microcontroller programmed to perform classification using the SVM classifier comprises the microprocessor or microcontroller of an embedded system.

In another disclosed aspect, an embedded system comprises the microprocessor or microcontroller of the immediately preceding paragraph. The microprocessor or microcontroller may, for example, be further programmed to perform an embedded system function such as engine control, brake control, entertainment system operation, or so forth, or an embedded system function for a vehicle, ocean buoy, or satellite.

In another disclosed aspect, an SVM classifier training system comprises a computer (for example, a cloud-based computing resource, a parallel processor system, or a cluster computer) programmed to train an SVM classifier employing a kernel $f(x_i,y) \propto \Pi_{d=1}^{D} F(x_{i,d}, y_d)$ or a kernel $f(x_i,y) \propto \Sigma_{d=1}^{D} F(x_{i,d}, y_d)$ where D is the dimensionality of Support Vectors $x_i$ and of data vectors y, and to generate a look-up table containing the possible values for at least one term $F(x_{i,d}, y_d)$ of the kernel $f(x_i,y)$.

In another disclosed aspect, a classification method comprises applying an SVM classifier employing a kernel $f(x_i,y) \propto \Pi_{d=1}^{D} F(x_{i,d}, y_d)$ or a kernel $f(x_i,y) \propto \Sigma_{d=1}^{D} F(x_{i,d}, y_d)$ to classify a vector y, where D is the dimensionality of Support Vectors $x_i$, where the applying includes determining at least some terms $F(x_{i,d}, y_d)$ of the kernel $f(x_i,y)$ using a look-up table. The applying is suitably performed by a microprocessor or microcontroller.

DETAILED DESCRIPTION

Figure 1:
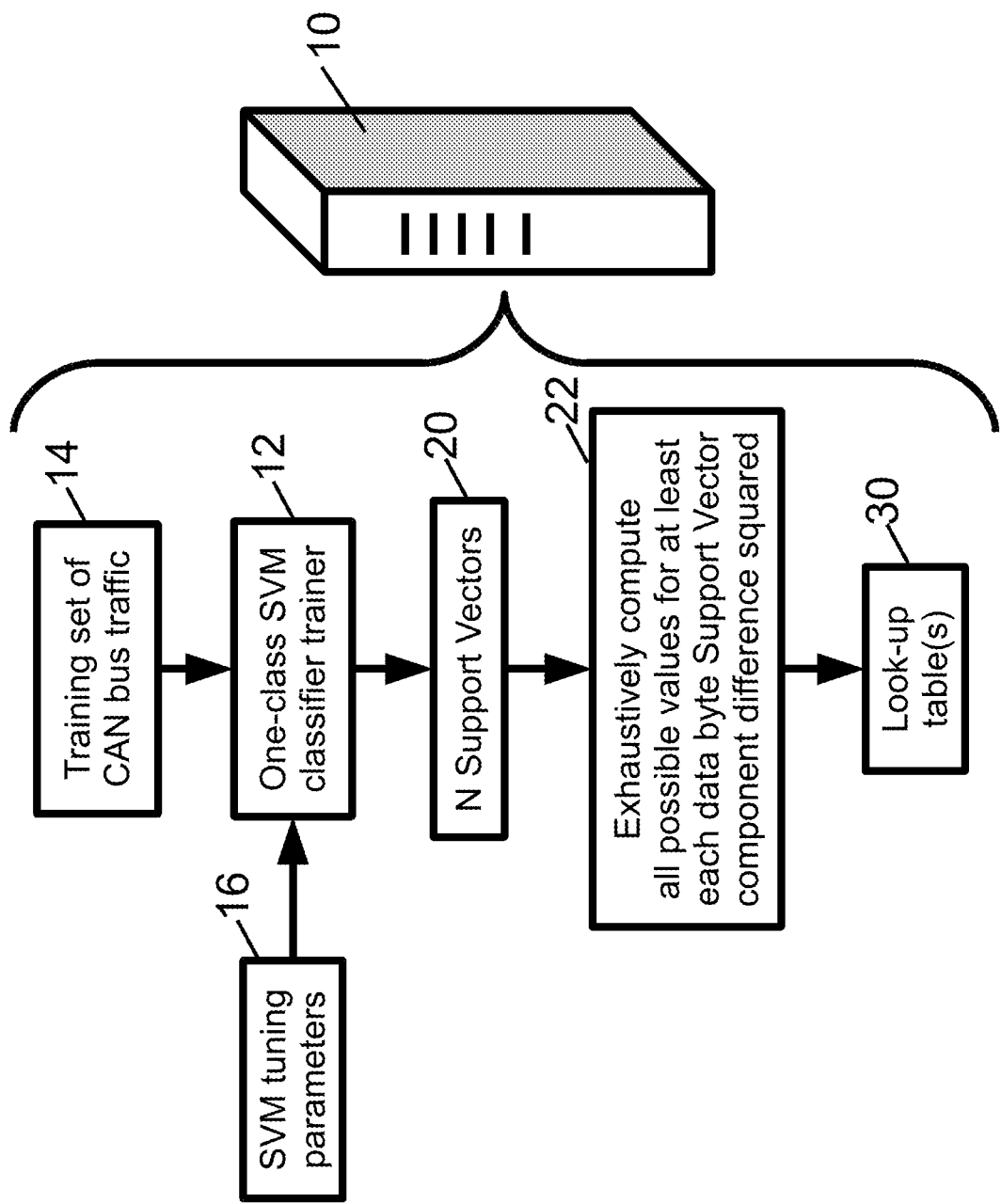
FIG. 1 diagrammatically shows a classifier training system in accord with illustrative embodiments disclosed herein.

An approach to CAN bus security in the face of this "zero knowledge" context is zero knowledge anomaly detection. In a rough conceptual sense, an anomaly is either a glitch or an intrusion (e.g. hacking)—more generally, CAN bus traffic that should not be present. In the CAN bus context, a priori knowledge of what types of messages may be transmitted by a given ECU may be limited (e.g., due to traffic introduced by aftermarket components connected with the CAN bus).

As used herein, an anomaly is defined as follows: an anomaly is a statistically significant deviation from normal CAN bus behavior as gleamed from CAN bus message traffic. "Statistically significant" means that the deviation from normal CAN bus behavior is sufficient, measurable and greater than the allowable limit. An anomaly detection system can be constructed based on statistical analysis of a training data set consisting of CAN bus traffic acquired from a vehicle known to be operating normally. For example, training data can be acquired at the automobile manufacturer facility, using a vehicle straight off the assembly line, or a pre-production model, or some other vehicle. This approach is unusual in that the training data are all "negative" samples, that is, all of the training data are "normal" and none of the training data are anomalies. Thus, ideally, after training on such data the anomaly detection system should not generate any anomaly alerts.

In approaches disclosed herein, the anomaly detection algorithm comprises a Support Vector Machine (SVM) trained to operate as a one-class classifier outputting either a positive value (indicating an anomaly) or a negative value (indicating a normal message). (The one-class classifier can also be thought of as a binary classifier in which one "class" is "anomaly" and the other "class" is "normal message" or "not anomaly"). Each message is treated as a vector residing in a high-dimensional vector space. For example, in one CAN bus architecture a message includes (in time-order): an 11-bit message ID (with an optional 18-bit extension message ID); network ID denoting the network bus the message arrived on; and eight data bytes. This can be represented by a vector having ten dimensions: one dimension for the message ID; one dimension for the network (or BUS) ID; and eight additional dimensions for the eight respective data bytes. In the SVM paradigm, the training set consists of a set of training vectors, and a sub-set of the training vectors forms the set of Support Vectors. A hyperplane is defined respective to the Support Vectors that is optimized by the SVM training to separate positive samples from negative samples while maximizing margins to the nearest training samples in the vector space. The illustrative one-class SVM classifier employs a Radial Basis Function (RBF) as the kernel for defining the hyperplane. Representing a Support Vector by x and a (message) vector to be classified by y, the RBF $f(x,y)$ is defined as:

$$f(x, y) = e^{-\gamma((x_1-y_1)^2+(x_2-y_2)^2+...+(x_D-y_D)^2)} \quad (1)$$

where D is the number of dimensions of the vectors (e.g. D=10 in the illustrative CAN bus message with a message and a network ID element and eight data bytes) and y characterizes the curvature of the RBF kernel $f(x,y)$. During SVM training, the Support Vectors are chosen from the training sub-set by the SVM training algorithm so as to provide positive/negative sample segregation with maximized margins, typically subject to additional constraints defined by tuning parameters.

In a typical SVM approach, the tuning parameters include the already-mentioned $\gamma$ parameter, which controls the shape or curvature of the separating hyperplane. A larger value of $\gamma$ increases hyperplane curvature and also tends to increase the number of Support Vectors chosen during the SVM training. Another tuning parameter, $\nu$, defines a lower bound on the number of Support Vectors, and also presents an upper bound on the number of training samples that may be erroneously classified (this error count can be reduced by forced adding of Support Vectors). A tuning parameter E defines a penalty for data points inside the margin (i.e. too close to the hyperplane), and may be viewed as controlling granularity of the hyperplane.

Conventionally, SVM training is performed as follows. The tuning parameters $\gamma$, $\nu$, $\varepsilon$ (or additional or other tuning parameters depending upon the particular SVM model being employed) are chosen, and SVM training is performed to optimize selection of the Support Vectors so as to optimally segregate positive from negative samples while satisfying constraints defined by the tuning parameters $\gamma$, $\nu$, $\varepsilon$. In the conventional approach, the user may then choose to adjust the tuning parameters $\gamma$, $\nu$, $\varepsilon$ and repeat the training, so as to tune the SVM classifier by trial-and-error. After the training phase is complete, the trained SVM classifier is applied to classify a new message represented by the message vector y according to:

$$\sum_{i=1}^{N} f(x_i, y) > \rho \quad (2)$$

where $f$ is given in Expression (1), the tuning parameters $\gamma$, $\nu$, $\varepsilon$ from the training are used, N is the number of support vectors chosen by the SVM training, and the vectors $x_1, \ldots, x_N$ are the Support Vectors chosen by the training. The message y is classified as anomalous if the sum in Expression (2) is greater than the threshold $\rho$ because it is too far away from the trained hyperplane; otherwise, the message is classified as normal. Since the parameter $\varepsilon$ relates to the margin around the trained hyperplane, in some embodiments the threshold $\rho=N\varepsilon$ is used in Expression (2).

For CAN network security, the trained SVM classifier is implemented on an ECU (either as an additional function of an existing ECU, or as a separate ECU dedicated to providing CAN network security). The computing power of the ECU is limited, as it can usually be, at most, a standalone multi-core CPU system. On the other hand, the SVM training can be performed offline with massive computing power brought to bear, for example using a cloud computing system or other parallel computing system that may include dozens or more CPUs.

A problem can arise because the ECU may have insufficient computing capacity to execute the trained one-class SVM classifier. Expanding Expression (2) by inserting Equation (1) yields:

$$\left[ e^{-\gamma((x_{SV1,1}-y_1)^2+...+(x_{SV1,D}-y_D)^2)} + \right. \quad (3)$$
$$\left. ... + e^{-\gamma((x_{SVN,1}-y_1)^2+...+(x_{SVN,D}-y_D)^2)} \right] > \rho$$

where in Expression (3) the subscripts SV1, . . . , SVN denote the N Support Vectors, so that, for example, $x_{SV1,2}$ denotes the second dimension of Support Vector $x_1$. Existing commercial production automobiles have CAN bus traffic density on the order of 3,000-5,000 messages per second, each of which needs to be classified by the trained SVM classifier in accordance with Expression (3). This level of computation requires roughly 200 M FLOPS, which is not achievable with presently existing automotive class hardware specifications.

To reduce the number of computations, the computational complexity of Expression (1), the exponential for a single Support Vector (denoted without loss of generality as Support Vector $x_i$) can be greatly reduced as follows. First, the $e^{-\gamma}$ term can be pulled out in accord with the rule $e^{ab}=(e^b)^a$ so as to yield:

$$f(x_i, y) = \left( e^{((x_{i,1}-y_1)^2+(x_{i,2}-y_2)^2+...+(x_{i,D}-y_D)^2)} \right)^{-\gamma} \quad (4)$$

where $x_{i,1}$ denotes the value of the first dimension of Support Vector $x_i$, and $x_{i,2}$ denotes the value of the second dimension of Support Vector $x_i$, and so forth. Then the rule $e^{a+b}=e^a \cdot e^b$ can be applied to yield:

$$f(x_i, y) = \left( e^{(x_{i,1}-y_1)^2} \cdot e^{(x_{i,2}-y_2)^2} \cdot \ldots \cdot e^{(x_{i,D}-y_D)^2} \right)^{-\gamma} \quad (5)$$

For an illustrative ten-dimensional message (D=10) having a message ID, an optional extension message ID (or network ID), and eight data bytes, the dimensions 3 . . . 10 correspond to the eight data bytes. Each of these dimensions 3, . . . , 10 can thus assume only integer values in the range 0, . . . , 255. Moreover, the values $x_{i,3}, \ldots, x_{i,10}$ are fixed values for the Support Vector $x_i$. Thus, for example, $$e^{(x_{i,3}-y_3)^2}$$

can only assume 256 possible values corresponding to the respective possible data byte values $y_3=0, \ldots, 255$. Thus, Expression (5) reduces to:

$$f(x_i, y) = \left( e^{(x_{i,1}-y_1)^2} \cdot e^{(x_{i,2}-y_2)^2} \cdot T(i, 3, y_3) \cdot T(i, 4, y_4) \cdot T(i, 5, y_5) \cdot \right. \quad (6)$$
$$\left. T(i, 6, y_6) \cdot T(i, 7, y_7) \cdot T(i, 8, y_8) \cdot T(i, 9, y_9) \cdot T(i, 10, y_{10}) \right)^{-\gamma}$$

where, for example, $T(i,3,y_3)$ is the look-up table entry for Support Vector $x_i$, third dimension, for value $y_3$. Thus, all eight message byte values $$e^{(x_{i,3}-y_3)^2}, \ldots, e^{(x_{i,10}-y_{10})^2}$$

can be stored in a table with dimensions (1 N; 3 . . . 10; 0 . . . 255). The inventors estimate that N=520 should be a sufficient number of Support Vectors for most automotive CAN bus security monitoring applications, so this table is of reasonable size.

The message and network ID dimensions, that is, the terms $$e^{(x_{i,1}-y_1)^2} \text{ and } e^{(x_{i,2}-y_2)^2},$$

are more complex, and whether a look-up table approach is viable depends upon the particular message ID format, especially the number of bits. Assuming the first dimension is a message ID of fixed 11 bits, corresponding to 2048 possible message IDs, a look-up table for the message ID having dimensions (1 N; 0 . . . 2047) is feasible. If a second ID field (network ID) is provided, a tabular approach for this would employ a table of dimensions (1 . . . N; 0 . . . 262,143), which may be feasible depending upon storage capacity. On the other hand, if the CAN network architecture employs a single message ID that is 29 bits, this corresponds to 536,870,912 possible message IDs, so that a table approach may not be feasible. However, if a small sub-set of the 536,870,912 possible message IDs are actually used (as determined, for example, based on training data), then it may be possible to use a look-up table such as one of dimensions (1 . . . N; 1 . . . S; 1 . . . S) where S denotes the actually used message ID values.

In sum, for a standard CAN bus architecture, all but (at most) one dimension of Expression (6) can be handled using a look-up table, or two or three look-up tables if additional table(s) are needed for the message ID dimension(s). Evaluation of Expression (6) is reduced in complexity by about an order of magnitude as compared with evaluation of Expression (3), down to about 20 M FLOPS compared with 200 M FLOPS for Expression (3). The cost of this approach is higher storage space for the trained one-class SVM classifier due to the need to store the look-up tables. In one design, the look-up tables are estimated to require about 10 megabytes of storage space, which is within the storage capacity of existing automotive class embedded systems.

Figure 2:
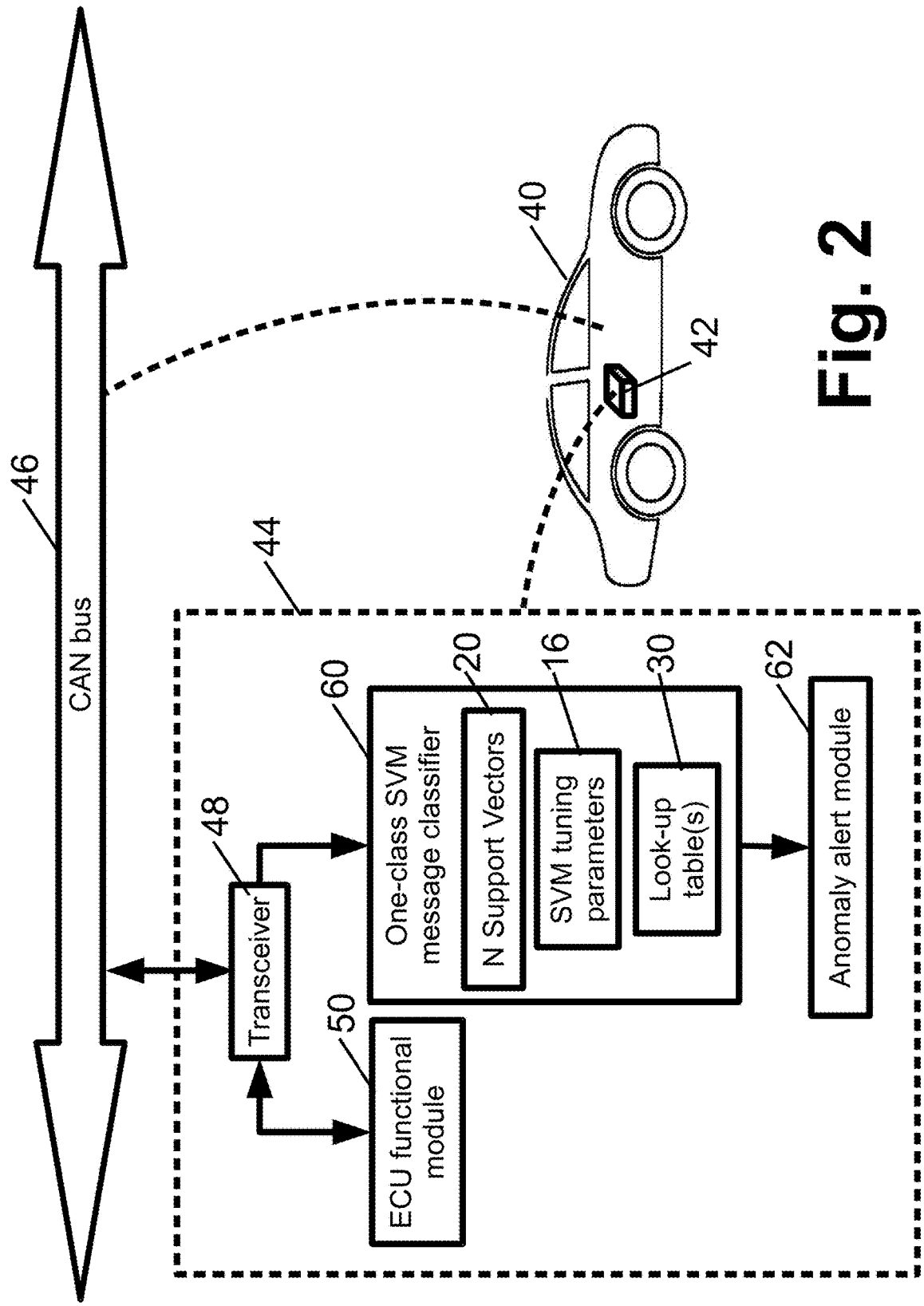
FIG. 2 diagrammatically illustrates a classifier in accord with illustrative embodiments disclosed herein.

With reference to FIGS. 1 and 2, an illustrative embodiment is shown, including the training system (FIG. 1) and the embedded system (FIG. 2).

With particular reference to FIG. 1, the one-class SVM classifier training is suitably performed by a high-capacity computing system, such as an illustrative server computer 10, which may be cloud-based (i.e. a cloud computing resource), a parallel processor system, cluster computer, or so forth. The training is performed by a one-class SVM classifier trainer 12 using a training set of CAN bus traffic 14 represented as vectors as described herein (e.g. one or two dimensions for message/network ID information, and eight dimensions for the data bytes) and SVM tuning parameters 16. The SVM trainer 12 outputs a set of Support Vectors 20 chosen from the training data 14. The training may also entail optimizing the SVM tuning parameters 16, either by trial-and-error (e.g. a human analyst re-runs the SVM trainer 12 using different values for the SVM tuning parameters 16, or an automated approach such as a grid search is used to optimize the SVM tuning parameters 16). The illustrative SVM that is trained by the SVM trainer 12 employs a Radial Basis Function (RBF) as the kernel. More generally, the disclosed approaches are applicable to any SVM that employs a kernel:

$$f(x_i, y) \propto \prod_{d=1}^{D} F(x_{i,d}, y_d) = \prod_{d=1}^{D} e^{-\gamma(x_{i,d}-y_d)^2} \quad (7)$$

where Expression (7) is written for Support Vector $x_i$, D denotes the number of dimensions of the vector, the symbol "$\propto$" is conventionally used to denote a proportional relationship, and the right-most equality is the illustrative RBF earlier set forth using alternative notation as Expression (1). The disclosed approaches are applicable to any SVM that employs a kernel:

$$f(x_i, y) \propto \sum_{d=1}^{D} F(x_{i,d}, y_d) \quad (8)$$

With continuing reference to FIG. 1, after the N support vectors 20 are determined by the training system 12, a look-up table generator 22 is applied to exhaustively compute all possible values for at least those terms $F(x_{i,d},y_d)$ corresponding to data bytes. More generally, the look-up table generator 22 can be applied to exhaustively compute all possible values any term $F(x_{i,d},y_d)$ for which $x_{i,d}$ and $y_d$ can only assume values defined by a finite (i.e. closed) set of values, such as the set of integers {0, . . . , 255} for an 8-bit data byte, or the set of integers {0, . . . , 2047} for an 11-bit message ID dimension. The output of the look-up table generator 22 is a set of one or more look-up tables 30. It should be noted that while the look-up table generator 22 may require substantial computing resources, those computing resources are available in the form of the illustrative server computer 10 (which may be cloud-based, a parallel processor system, cluster computer, or so forth). Thus, the look-up table generator 22 is not limited by the limited computing power or resources of any automotive-class ECU.

With particular reference to FIG. 2, a vehicle 40, such as an illustrative automobile, or a truck, watercraft (boat, ship, et cetera), aircraft (airplane, blimp, helicopter, et cetera) includes at least one (and typically many) embedded system 42 comprising an electronic control unit (ECU) 44 (shown diagrammatically in the inset). The vehicle 40 also includes at least one (and possibly two or more) Controller Area Network bus (CAN bus) 46 via which the embedded systems can intercommunicate. To this end, the illustrative ECU 44 includes a transceiver 48 that transmits and receives messages via the CAN bus 46. The ECU 44 comprises a microprocessor or microcontroller and ancillary electronics (e.g. memory, the illustrative transceiver 48, or so forth) programmed to provide the desired functionality of the embedded system 42. This functionality is represented in the inset diagram representing the ECU 44 as an ECU functional module 50. For example, the ECU functional module 50 may provide engine control, brake control, entertainment system operation, or so forth.

To provide CAN network security functionality, the ECU 44 is further programmed to implement a one-class SVM message classifier 60 that classifies each message passing through the transceiver 48 as either "normal" or "anomaly". Preferably, both sent and received messages are classified, although it is contemplated to only classify received messages under the assumption that the embedded system 42 is secure, and/or under the assumption that any anomalous transmission events generated by the embedded system 42 will be detected by other ECUs on the CAN bus 46 also running instances of the one-class SVM message classifier 60. In this regard, it should be noted that under typical CAN network architectures, every ECU on the CAN network receives every message, not just those messages relevant to the ECU. Thus, the SVM message classifier 60 can classify every message on the CAN bus 46 as either "normal" or "anomalous". The one-class SVM message classifier 60 employs the trained SVM produced by the system of FIG. 1, including using the N Support Vectors 20, the (optionally optimized) SVM tuning parameters 16, and the look-up table(s) 30. To classify a message represented by a vector y, Expression (2) is evaluated, using the look-up table(s) 30 to evaluate at least some terms $F(x_{i,d}, y_d)$ of the kernel function $f(x_i, y)$ for each Support Vector $x_i$. The one-class SVM message classifier 60 is thus computationally efficient as compared with evaluating all terms of the $F(x_{i,d}, y_d)$ of the kernel function $f(x_i, y)$ directly, i.e. without reference to the look-up table(s) 30.

The output of the one-class SVM message classifier 60 for each input message y is either "anomaly" or "normal". These classifications are input to an anomaly alert module 62. The anomaly alert module 62 issues an anomalous event alert if the detected anomalous messages meet some alert criterion, such as observing a density of anomalous messages (i.e. a count of anomalous messages in a defined time window) that exceeds a threshold. The issued anomalous event alert may be used in various ways. For example, if the anomalous events are traced to a particular ECU, then a warning that the ECU is compromised (either intentionally or due to some flawed firmware upgrade, malfunction, or the like that is causing the ECU to generate glitches). Such a warning may appear on the on-board computer display of the vehicle 40, or may be wirelessly transmitted to a centralized location (e.g. a monitoring center of the automobile manufacturer, who uses the information to monitor firmware upgrades) or so forth.

While described in the context of vehicle embedded system security monitoring, it will be appreciated that the disclosed look-up table(s)-based SVM classifiers may be used in other applications where computational power for training is plentiful but the implemented SVM classifier is intended to execute on a more computationally limited electronic data processing device. For example, the disclosed SVM classifiers can be used for anomaly detection in the context of ocean buoys, orbiting satellites, and other systems with limited computational capacity. While anomaly detection is the illustrative application, in other cases the classifier may be used to classify other received or transmitted information, such as classifying data acquired by an ocean buoy, classifying satellite telemetry information, and so forth. As previously noted, the look-up table(s) may be used to compute some, most, or all of the terms $F(x_{i,d}, y_d)$ of the SVM kernel $f(x_i, y)$ of Equation (7) or Equation (8).

It will further be appreciated that the disclosed techniques may be embodied as a non-transitory storage medium storing instructions readable and executable by a computer, (microprocessor or microcontroller of an) embedded system, or various combinations thereof. The non-transitory storage medium may, for example, comprise a hard disk drive, RAID or the like of a computer; an electronic, magnetic, optical, or other memory of an embedded system, or so forth.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method comprising:
using a transceiver, transmitting and receiving messages via a Controller Area Network (CAN) bus of a vehicle;
using a microprocessor or microcontroller, classifying at least messages received from the CAN bus by the transceiver as normal or anomalous using a Support Vector Machine (SVM) classifier employing a kernel $f(x_i, y) \propto \Pi_{d=1}^{D} F(x_{i,d}, y_d)$ or a kernel $f(x_i, y) \propto \Sigma_{d=1}^{D} F(x_{i,d}, y_d)$ where D is the dimensionality of Support Vectors $x_i$ and vector y is a vector representing the message being classified, the classification being performed using the SVM classifier with at least some terms $F(x_{i,d}, y_d)$ of the kernel $f(x_i, y)$ determined using a look-up table; and
using the microprocessor or microcontroller, performing an engine control, brake control, or entertainment system operation for the vehicle.

2. The method of claim 1 wherein the kernel $f(x_i, y)$ is a Radial Basis Function (RBF) kernel.

3. The method of claim 1 wherein for those terms $F(x_{i,d}, y_d)$ of the kernel $f(x_i, y)$ determined using a look-up table, the dimension $y_d$ can only assume values defined by a finite set of values.

4. The method of claim 1 wherein for those terms $F(x_{i,d}, y_d)$ of the kernel $f(x_i, y)$ determined using a look-up table, the dimension $y_d$ can only assume values defined by a finite set of integers.

5. The method of claim 1 wherein the microprocessor or microcontroller programmed to perform classification using the SVM classifier comprises the microprocessor or microcontroller of an embedded system.

6. The method of claim 1 further comprising, using the microprocessor or microcontroller, performing an embedded system function for the vehicle.

7. The method of claim 1 wherein the classifying includes classifying both messages received from the CAN bus by the transceiver and messages sent to the CAN bus by the transceiver as normal or anomalous using the SVM classifier employing the kernel $f(x_i,y) \propto \Pi_{d=1}^{D} F(x_{i,d}, y_d)$ or a kernel $f(x_i,y) \propto \Sigma_{d=1}^{D} F(x_{i,d}, y_d)$, the classification being performed using the SVM classifier with at least some terms $F(x_{i,d}, y_d)$ of the kernel $f(x_i, y)$ determined using the look-up table.

8. The method of claim 1 further comprising, using the microprocessor or microcontroller, outputting an alert if the classifications of messages as anomalous by the SVM classifier meet an alert criterion.

9. The method of claim 8 wherein the alert criterion includes a density of anomalous messages exceeding a threshold.

10. The method of claim 8 wherein the alert is output as at least one of a warning displayed on an on-board computer display of the vehicle or a wireless alert transmission.

11. A non-transitory storage medium storing instructions readable and executable by a microprocessor or microcontroller of an Electronic Control Unit (ECU) of a vehicle to perform a classification method for classifying Controller Area Network (CAN) messages, the classification method comprising:

receiving CAN messages from a CAN bus of the vehicle via a transceiver of the ECU;

for each received message, applying a Support Vector Machine (SVM) classifier employing a kernel $f(x_i,y) \propto \Pi_{d=1}^{D} F(x_{i,d}, y_d)$ or a kernel $f(x_i,y) \propto \Sigma_{d=1}^{D} F(x_{i,d}, y_d)$ to classify a vector y representing the received CAN message, where D is the dimensionality of Support Vectors $x_i$; and causing the ECU to output an alert if the classifications of messages by the SVM classifier meet an alert criterion;

wherein the applying includes determining at least some terms $F(x_{i,d}, y_d)$ of the kernel $f(x_i, y)$ using a look-up table.

12. The non-transitory storage medium of claim 11 wherein:

the classification method further includes transmitting a CAN message to the CAN of the vehicle via the transceiver of the ECU; and the applying further includes applying the SVM classifier to classify a vector y representing the transmitted CAN message.

13. The non-transitory storage medium of claim 11 wherein the alert criterion includes a density of messages classified as anomalous by the SVM classifier exceeding a threshold.

14. The non-transitory storage medium of claim 11 wherein the alert is outputted as at least one of a warning displayed on an on-board computer display of the vehicle or a wireless alert transmission.

15. The non-transitory storage medium of claim 11 further storing instructions readable and executable by a microprocessor or microcontroller of the ECU of the vehicle to perform an engine control, brake control, or entertainment system operation for the vehicle.

16. A method comprising:

using a server computer, generating a Support Vector Machine (SVM) classifier by operations including:
(1) training an SVM classifier employing a kernel $f(x_i,y) \propto \Pi_{d=1}^{D} F(x_{i,d}, y_d)$ or a kernel $f(x_i,y) \propto \Sigma_{d=1}^{D} F(x_{i,d}, y_d)$ where D is the dimensionality of Support Vectors $x_i$ and of data vectors y; and
(2) generating a look-up table containing the possible values for at least one term $F(x_{i,d}, y_d)$ of the kernel $f(x_i, y)$ which term $F(x_{i,d}, y_d)$ has a finite number of possible values; and using a microprocessor or microcontroller of an Electronic Control Unit (ECU) of a vehicle having a Controller Area Network (CAN) bus:
(3) receiving messages from the CAN bus via a transceiver of the ECU and, for each message, applying the trained SVM classifier to classify a vector y representing the received message, wherein the applying includes determining at least some terms $F(x_{i,d}, y_d)$ of the kernel $f(x_i, y)$ using the generated look-up table.

17. The method of claim 16 further comprising, using the microprocessor or microcontroller of the ECU of the vehicle, performing an engine control, brake control, or entertainment system operation for the vehicle.

* * * * *